(12) United States Patent
Heutmaker et al.

(10) Patent No.: US 8,280,314 B2
(45) Date of Patent: Oct. 2, 2012

(54) METHOD AND APPARATUS FOR COMPENSATING FOR TRANSCEIVER IMPAIRMENTS

(75) Inventors: Michael Steven Heutmaker, Ewing, NJ (US); Walter Honcharenko, Monmouth Junction, NJ (US)

(73) Assignee: Alcatel Lucent, Paris (FR)

( * ) Notice: Subject to any disclaimer, the term of this patent is extended or adjusted under 35 U.S.C. 154(b) by 732 days.

(21) Appl. No.: 12/494,862

(22) Filed: Jun. 30, 2009

(65) Prior Publication Data

US 2010/0330929 A1 Dec. 30, 2010

(51) Int. Cl.
*H04L 27/00* (2006.01)
*H04L 27/04* (2006.01)
(52) U.S. Cl. .......... 455/73; 455/62; 455/63.1; 455/75; 455/78; 455/84; 455/550.1; 455/114.1; 455/114.2; 455/115.1; 455/115.2; 455/119; 455/120; 455/126; 455/130; 455/226.1; 455/227; 455/230; 455/278.1; 455/283; 455/284; 455/296; 455/304; 455/305; 455/310; 455/311; 455/312; 455/317
(58) Field of Classification Search .................. None
See application file for complete search history.

(56) References Cited

U.S. PATENT DOCUMENTS

| | | | |
|---|---|---|---|
| 7,313,198 B2 * | 12/2007 | Rahman et al. | 375/297 |
| 7,988,765 B2 * | 8/2011 | Allam | 95/96 |
| 2005/0047494 A1 | 3/2005 | Sasson et al. | 375/219 |
| 2010/0008449 A1 * | 1/2010 | Sayers | 375/322 |

FOREIGN PATENT DOCUMENTS

| | | |
|---|---|---|
| WO | WO 2007/146090 | 12/2007 |
| WO | WO 2008/142682 | 11/2008 |

OTHER PUBLICATIONS

International Search Report PCT/US2010/038573 dated Sep. 23, 2010.
Written Opinion.

* cited by examiner

*Primary Examiner* — Fayyaz Alam
*Assistant Examiner* — Mohammed Rachedine
(74) *Attorney, Agent, or Firm* — Williams, Morgan & Amerson (57) ABSTRACT

A method for compensating a transceiver for impairments includes transmitting a plurality of partial bandwidth training signals using a transmitter. A plurality of response signals of a receiver having a bandwidth and exhibiting receiver impairments is captured. Each response signal is associated with one of the partial bandwidth training signals. Each of the partial bandwidth training signals is associated with a portion of the receiver bandwidth. A plurality of partial compensation filters is generated based on the plurality of response signals. Each partial compensation filter is associated with one of the response signals. The partial compensation filters are combined to configure a receiver compensation filter operable to compensate for the receiver impairments.

20 Claims, 4 Drawing Sheets

METHOD AND APPARATUS FOR COMPENSATING FOR TRANSCEIVER IMPAIRMENTS

CROSS-REFERENCE TO RELATED APPLICATIONS

Not applicable.

BACKGROUND

The disclosed subject matter relates generally to telecommunication and, more particularly, to a method and apparatus for compensating for transceiver impairments.

In telecommunication, direct-conversion techniques involve mixing a baseband signal with a carrier signal without using an intermediate frequency. A direct conversion receiver (DCR), also known as homodyne, synchrodyne, or zero-IF receiver, may then demodulate incoming signals by mixing the incoming signal with a local oscillator signal synchronized in frequency to the carrier signal. The baseband signal may then be obtained simply by low-pass filtering the mixer output, without requiring further detection.

A direct conversion transceiver may be implemented on a single chip, making it inexpensive and versatile. However, the transmission and receive paths for the base band signals (i.e., in-phase (I) and quadrature (Q)) are independently formed. Small variances in these paths introduce amplitude and phase variations in the respective transmit and receive signals, otherwise referred to as IQ imbalance impairments.

To calibrate a direct conversion transceiver, the impairments must be identified and compensated for prior to use. This compensation is difficult because it is necessary to calibrate the direct conversion transmitter and direct conversion receiver individually using a separate external reference for each path. If an uncompensated receiver is used to calibrate a transmitter over the complete frequency span, the transmitter calibration will be corrupted by the impairments of the receiver, and vice versa.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for compensating a transceiver for impairments. The method includes transmitting a plurality of partial bandwidth training signals using a transmitter. A plurality of response signals of a receiver having a bandwidth and exhibiting receiver impairments is captured. Each response signal is associated with one of the partial bandwidth training signals. Each of the partial bandwidth training signals is associated with a portion of the receiver bandwidth. A plurality of partial compensation filters is generated based on the plurality of response signals. Each partial compensation filter is associated with one of the response signals. The partial compensation filters are combined to configure a receiver compensation filter operable to compensate for the receiver impairments.

Another aspect of the disclosed subject matter is seen a transceiver including a transmitter, a receiver, a receiver capture unit, a receiver compensation filter, and a receiver compensation estimation unit. The transmitter is operable to transmit a plurality of partial bandwidth training signals. The receiver has impairments and is operable to receive the plurality of partial bandwidth training signals. The receiver capture unit is operable to capture a plurality of response signals of the receiver. Each response signal is associated with one of the partial bandwidth training signals. Each of the partial bandwidth training signals is associated with a portion of the receiver bandwidth. The receiver compensation filter is operable to filter signals received by the receiver. The receiver compensation estimation unit is operable to generate a plurality of partial compensation filters based on the plurality of response signals. Each partial compensation filter is associated with one of the response signals. The receiver compensation estimation unit is operable to combine the partial compensation filters to configure the receiver compensation filter to compensate for the receiver impairments.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives failing within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
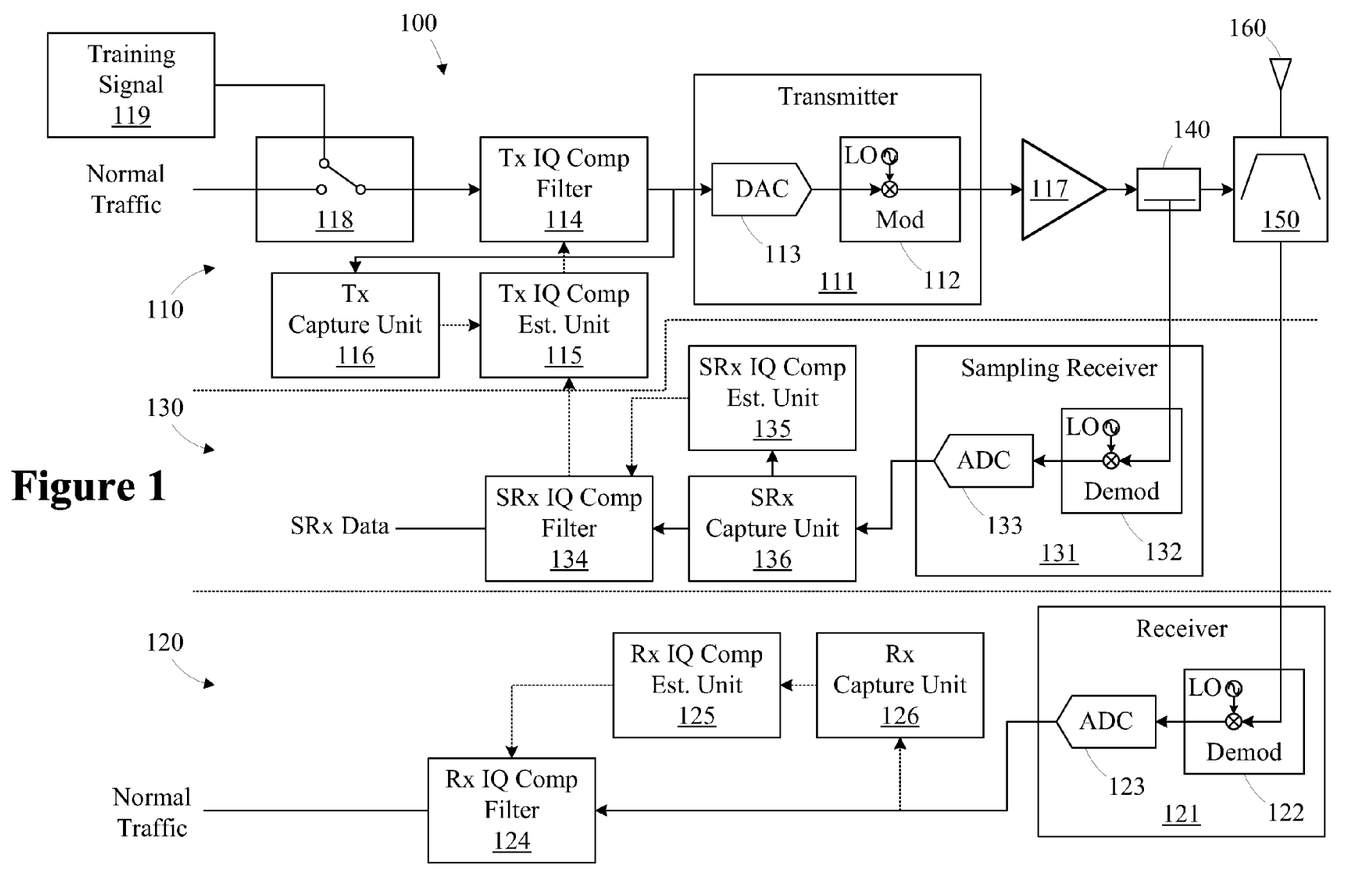
FIG. 1 is a simplified block diagram of a transceiver in accordance with one illustrative embodiment of the present subject matter.

Referring now to the drawings wherein like reference numbers correspond to similar components throughout the several views and, specifically, referring to FIG. 1, the disclosed subject matter shall be described in the context of a transceiver 100 including a transmit path 110, a receive path 120, and a sampling receive path 130. The transmit path 110 and the sampling receive path 130 are connected to a directional coupler 140, which is in turn connected to a filter panel 150 and an antenna 160. The directional coupler 140 prevents reflections from the filter panel 150 from affecting the sampling receive path 130. The filter panel 150 (i.e., commonly referred to as a duplexer) separates the outgoing transmit signal from the incoming receive signal, performs bandpass filtering of the transmit RF output, and performs bandpass filtering of the receiver RF input.

The transmit path 110 includes a transmitter 111 including a modulator 112 and a digital-to-analog converter (DAC) 113, a transmitter IQ compensation filter 114, a transmitter IQ compensation estimation unit 115, a transmitter capture unit 116, a power amplifier 117, and a switch 118 for selecting between normal data traffic or a training signal 119. The receive path 120 includes a receiver 121 including a demodulator 122 and an analog-to-digital converter (ADC) 123, a receiver IQ compensation filter 124, a receiver IQ compensation estimation unit 125, and a receiver capture unit 126. The sampling receive path 130 includes a sampling receiver 131 including a demodulator 132 and an ADC 133, a sampling receiver IQ compensation filter 134, a sampling receiver IQ compensation estimation unit 135, and a sampling receiver capture unit 136. The transmitter 111, receiver 121, and sampling receiver 131 are implemented using hardware, while the various units illustrated in FIG. 1 are implemented in the digital portion of the transceiver 100 (i.e., by a processing unit executing software or firmware). Hence, the units generally describe functions rather than discrete hardware. However, depending on the particular implementation, dedicated hardware may be employed to perform one or more of the functions attributed to the units.

The transmitter 111, receiver 121, and sampling receiver 131 employ inphase (I) and quadrature (Q) signals. The separate paths for these components are not shown for ease of illustration. Generally, the I and Q paths are separate, such that amplitude and phase variations exist between the paths. These variations cause separate impairments in the transmitter 111, the receiver 121, and the sampling receiver 131. The transmitter 111 and the sampling receiver 131 operate in the same frequency band. In the illustrated embodiment, the sampling receiver 131 is employed to compensate for transmitter impairments. After the transmitter 111 is compensated, it may be used to generate a training signal for compensating the receiver 121. However, because the sampling receiver 131 is used to estimate and compensate the transmitter 111, the impairments of the sampling receiver 131 must first be estimated and compensated. As known to those of ordinary skill in the art, the sampling receiver 131 may also be employed for functions such as digital predistortion or time division duplexing (i.e., functioning as the only receiver).

For a typical IQ transmitter 111, the unimpaired baseband signal may be represented by:

$$s(t)=s_I(t)+js_Q(t), \quad (1)$$

where $s_I(t)$, $s_Q(t)$ are the baseband in-phase and quadrature signal components.

The output of the modulator 112 is given by:

$$x(t)=i(t)+jq(t), \quad (2)$$

where $$i(t)=\alpha_I[s_I(t)\cos(\phi_I)+s_Q(t)\sin(\phi_I)]$$

$$q(t)=\alpha_Q[s_Q(t)\cos(\phi_Q)+s_I(t)\sin(\phi_Q)]', \quad (3)$$

and $\alpha_I, \alpha_Q, \phi_I, \phi_Q$ are the modulator imbalance errors (i.e., impairments).

Equation (2) can be rewritten in the form of a summation of two components comprised of a desired signal and its conjugate, $$x(t)=\alpha_1 s(t)+\alpha_2 s^*(t), \quad (4)$$

where $$a_1 = \frac{[\alpha_I\cos(\phi_I)+\alpha_Q\cos(\phi_Q)]-j[\alpha_I\sin(\phi_I)+\alpha_Q\sin(\phi_Q)]}{2} \quad (5)$$

$$a_2 = \frac{[a_I\cos(\phi_I)-\alpha_Q\cos(\phi_Q)]+j[\alpha_I\sin(\phi_I)-a_Q\sin(\phi_Q)]}{2}.$$

The complex conjugate of x(t) is given by:

$$x^*(t)=\alpha_1^* s^*(t)+\alpha_2^* s(t), \quad (6)$$

and by using x(t) and x*(t) as separate observations, the compensation required to minimize the imbalance errors in $\alpha_I, \alpha_Q, \phi_I, \phi_Q$ can be determined by exploiting the conjugate symmetry nature of the IQ imbalance. For purposes of illustration, the imbalance errors are provided here as scalar errors, but generally, the imbalance errors are functions of frequency $\alpha_I(f), \alpha_Q(f), \phi_I(f), \phi_Q(f)$.

To perform the compensation analysis, this symmetrical nature is employed by generating partial bandwidth training signals and measuring the full bandwidth response signal. Signal components arising from impairments are detected in the portion of the bandwidth not covered by the partial bandwidth training signal. The partial bandwidth process is continued until the full bandwidth has been covered, and the response signals from the partial bandwidth iterations are combined to compensate the receiver over the full bandwidth. For purposes of the following examples, a half bandwidth technique is used (i.e., two iterations), however, it is contemplated that more than two partial bandwidth partitions may be employed.

Figure 2A:
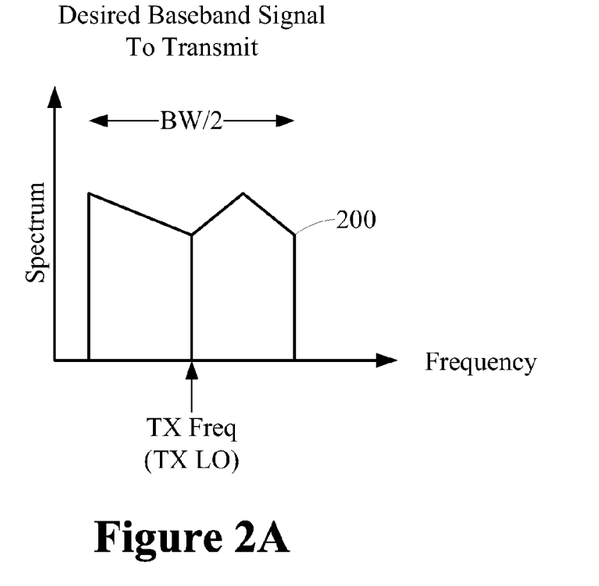
FIGS. 2A-2C illustrate training signals used for compensating a receiver in the transceiver of FIG. 1.
Figure 2B:
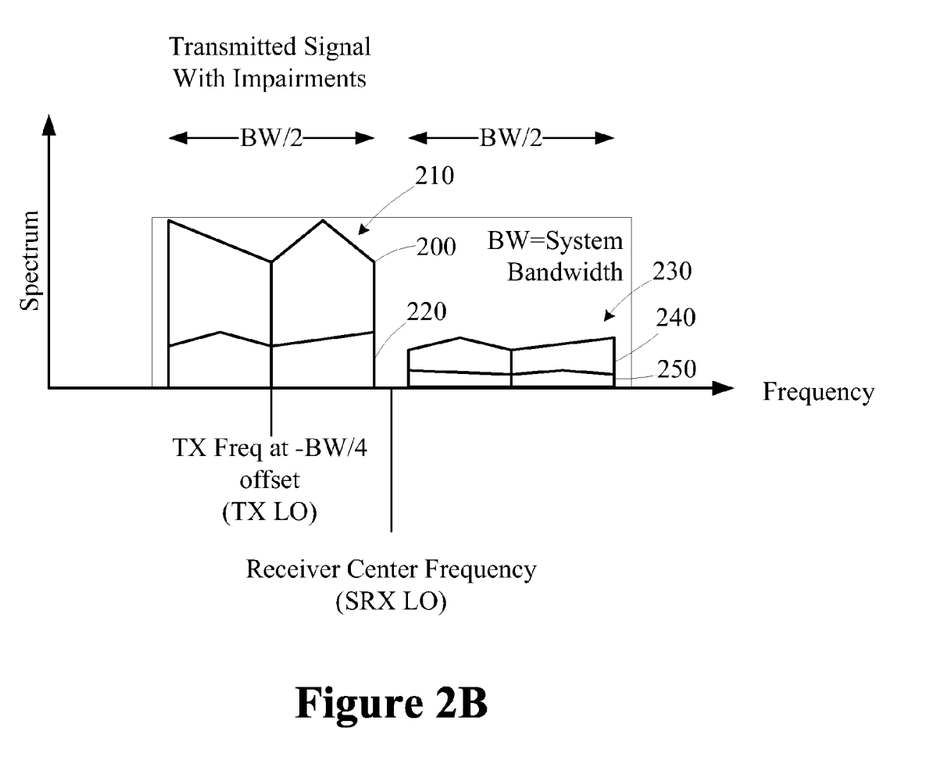

To facilitate compensation, the transmitter 111 is configured to select the training signal 119 using the switch 118 rather than the normal data traffic. FIG. 2A illustrates an exemplary transmit signal 200 that covers half of the calibration bandwidth. In the illustrated embodiment, the signal 200 is an arbitrary wideband signal that need not be flat with respect to frequency. FIG. 2b shows the response of the receiver 131 to the transmit signal 200. The actual transmit signal 210 transmitted by the modulator 112 and received by the receiver 131 is shown in FIG. 2B. Note that a transmitter impairment signal 220 is also present due to the IQ imbalances of the transmitter 111. The transmit signal 210 shown in FIG. 2B is transmitted by setting the local oscillator frequency of the modulator 112 to have a negative center frequency offset by approximately one fourth of the calibration bandwidth (i.e., −BW/4) from the center frequency of the sampling receiver 131, which places the transmit signal 210 into the lower half bandwidth of the sampling receiver 131. Due to the symmetrical nature of the IQ imbalance, the resulting receiver impairment signal 230 occupies the upper half-bandwidth and is separated from the transmitter impairment signal 220. Note that the receiver impairment signal 230 includes an impairment signal 240 representing impairments of the sampling receiver 131 arising from the transmit signal 200 and a receiver impairment signal 250 representing the impairments of the sampling receiver 131 arising from the transmitter impairment signal 220.

Figure 2C:
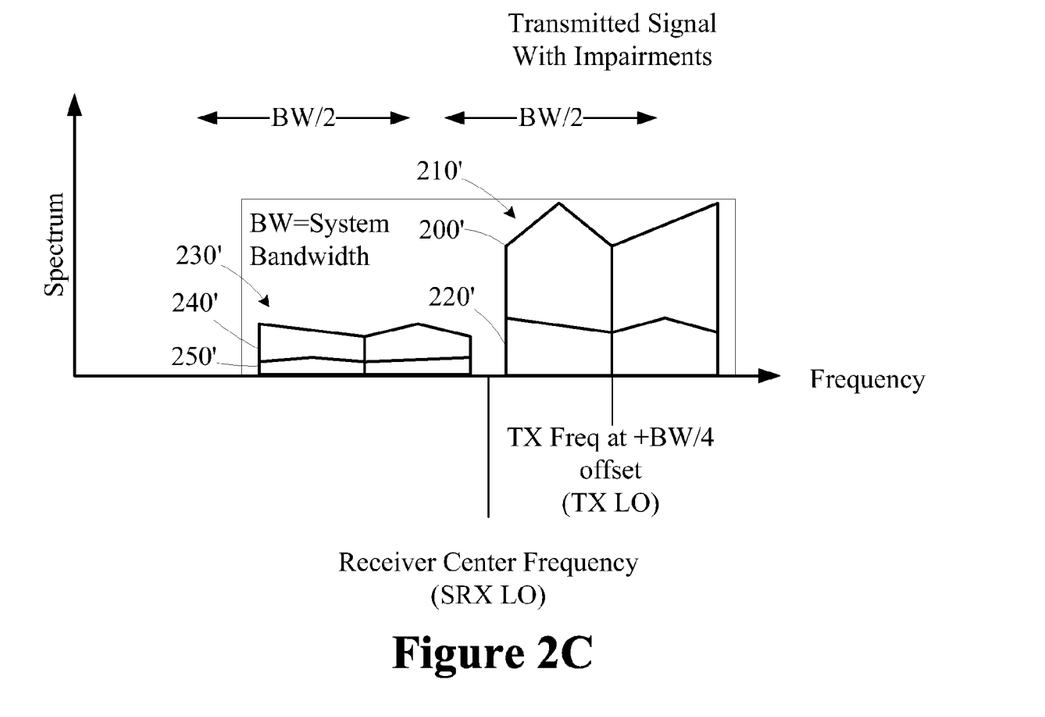

A second iteration is performed to cover the second half of the calibration bandwidth, as shown in FIG. 2C. The transmit signal 210' (i.e., including a transmit signal 200' and a transmitter impairment signal 220') is transmitted by setting the local oscillator frequency of the modulator 112 to have a positive center frequency offset by approximately one fourth of the calibration bandwidth (i.e., +BW/4) from the center frequency of the sampling receiver 131, which places the transmit signal 210' into the upper half bandwidth of the sampling receiver 131. Again, due to the symmetrical nature of the IQ imbalance, the resulting receiver impairment signal 230' occupies the lower half-bandwidth and is separated from the transmitter impairment signal 220'. The receiver impairment signal 230' includes an impairment signal 240' representing impairments of the sampling receiver 131 arising from the transmit signal 200' and a receiver impairment signal 250' representing the impairments of the sampling receiver 131 arising from the transmitter impairment signal 220'.

For each partial bandwidth iteration, the sampling receiver capture unit 136 records the response signal. Each partial bandwidth capture is used to generate a compensation filter for the corresponding bandwidth. The sampling receiver IQ compensation estimation unit 135 uses the capture information to generate coefficients for the sampling receiver IQ compensation filter 134.

Figure 3:
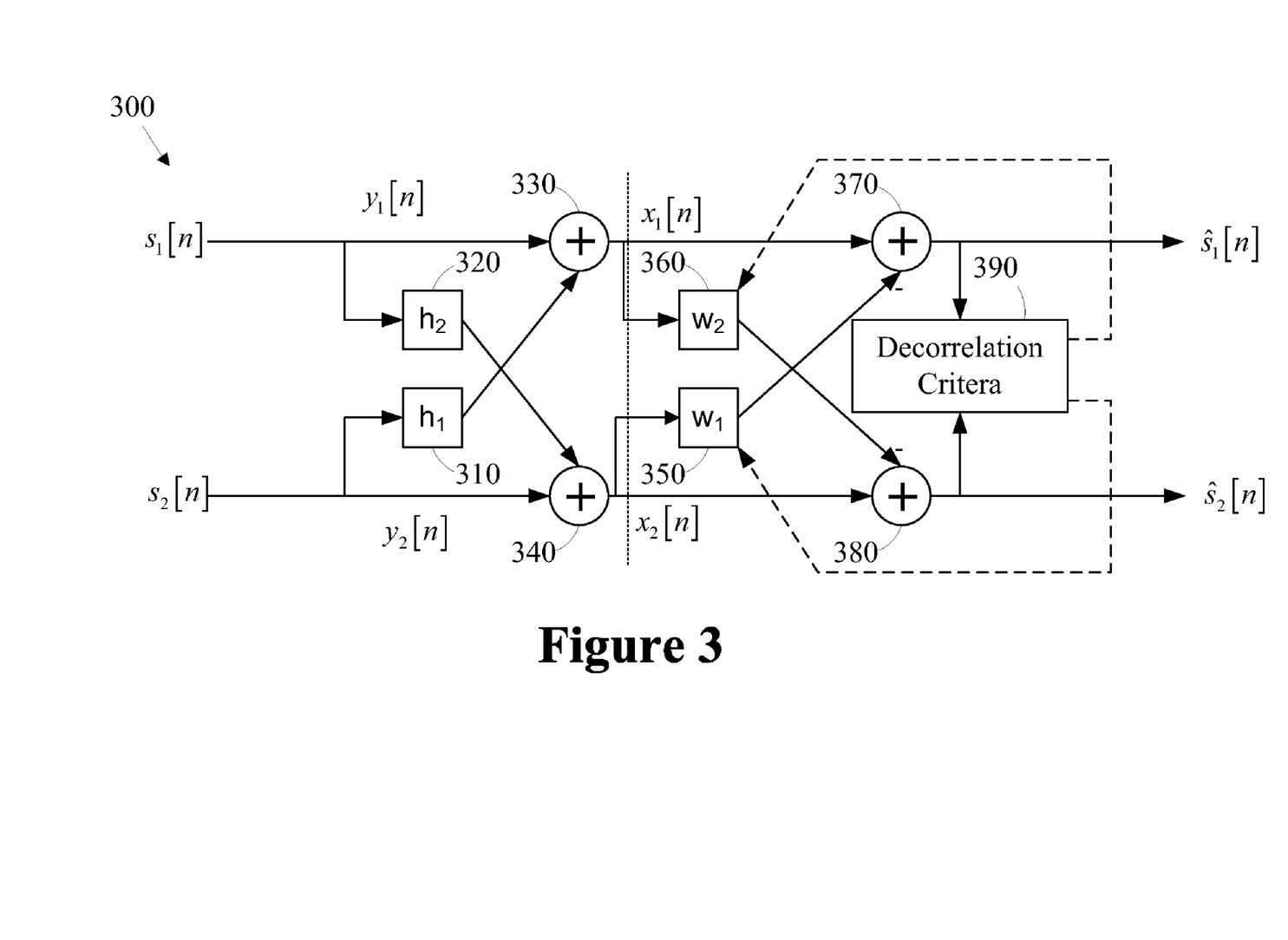
FIG. 3 is a diagram modeling receiver impairments for the transceiver of FIG. 1.

FIG. 3 illustrates an exemplary model 300 of the sampling receiver 131 impairments. The impairments are modeled by coefficients h1, h2 in blocks 310, 320. The modeled impairments $h_1$, $h_2$ are added into the desired signals $s_1[n]$, $s_2[n]$ by adders 330, 340, resulting in the impaired baseband signals $x_1[n]$, $x_2[n]$. The compensation conducted by the sampling receiver IQ compensation estimation unit 135 generates filter coefficients w1, w2 in blocks 350, 360, which are subtracted from the impaired baseband signals in adders 370, 380 to attempt to remove the impairments, resulting in received signals $\hat{s}_1[n]$, $\hat{s}_2[n]$. The decorrelation criteria block 390 represents the convergence criteria for the decorrelation algorithm. When the decorrelation criteria are met, the iterative adjustment of the filter taps is terminated.

As indicated above, the baseband signal x(t) can be written as the summation of the desired signal s(t) and its conjugate s*(t). The conjugate component after the down conversion process appears as an image opposite DC in the baseband frequency domain. To perform a compensation, the conjugate contribution in x(t) may be minimized though a blind adaptive estimation of $a_1$ and $a_2$ shown in Equation (5). One exemplary method to separate mixed signals is to use second order statistics to observe and minimize the correlation between the sources, provided that the source $s_1(t)=s(t)$ and its conjugate $s_2(t)=s^*(t)$ are uncorrelated. The signals are assumed to be zero mean, complex Gaussian random processes. The correlation for these signals is given by:

$$C_{ss^*}(\tau) = E[s(t+\tau)(s^*(t))^*]. \tag{6}$$

Separating in phase and quadrature components in the correlation of Equation (6), results in:

$$C_{ss^*}(\tau) = [C_{s_P s_I}(\tau) - C_{s_Q s_Q}(\tau)] + j[C_{s_P s_Q}(\tau) + C_{s_Q s_I}(\tau)] \tag{7}$$

The imaginary part of the correlation is zero if the in-phase and quadrature components of the signal are uncorrelated. The real part of the correlation is zero if the autocorrelation of both in-phase and quadrature components are the same. Although in-phase and quadrature component autocorrelation is not exactly the same for typical 3G and 4G broadband signals, the correlation is small, such that minimization through an adaptive scheme is possible.

The decorrelation of the received signals $\hat{s}_1[n]$, $\hat{s}_2[n]$ requires that $C_{\hat{s}\hat{s}^*}[0]=E[\hat{s}_1[n]\hat{s}^*_2[n]]=0$. This condition further leads to $$C_{\hat{s}\hat{s}^*}[0] = +(h_2^* - w_2^*)(1-w_1 h_2)R_{y_1 y_1}[0] + (h_1 - w_1)(1 - w_2^* h_1^*)R_{y_2 y_2}[0], \tag{8}$$

where the mixing coefficients are given by $$h_1 = \frac{b}{a^*} \text{ and } h_2 = \frac{b^*}{a},$$

and $R_{y_1 y_1}$, $R_{y_2 y_2}$ are autocorrelation coefficients of $y_1$ and $y_2$, respectively. The mixing coefficients are conjugates of each other, which implies $w_2 = w_1^*$. Assuming a simple case with only one tap to estimate, this is readily accomplished with a straightforward minimization algorithm that is similar to a Newton zero search, where the zero is in the cross correlation domain.

In a simple example, the sampling receiver IQ compensation estimation unit 135 may use the following signal separation procedure.

1. Capture signal x[n] into sampling receiver capture unit 136.
2. Form $x_1[n]=x[n]$ and $x_2[n]=x^*[n]$.
3. Form Signal Estimates.

$$\hat{s}_1[n]=x_1[n]-w_1^*[n]x_2[n]$$

$$\hat{s}_2[n]=x_2[n]-w_2^*[n]x_1[n]. \tag{9}$$

4. Update the coefficient weights.

$$w_1[n+1] = w_1[n] + 2\mu\hat{s}_2[n]\hat{s}_1^*[n] \quad (10)$$
$$w_2[n+1] = w_1^*[n+1]$$
$$0 < \mu < \frac{1}{R_{x_2x_2}[0]},$$

where $\mu$ is a convergence parameter for the LMS algorithm, and $R_{x_2x_2}$ is an autocorrelation coefficient of $x_2$.

The IQ imbalance observed on typical commercial modulators and demodulators is frequency dependent, and a single tap solution is not usually adequate to compensate the IQ imbalance image across a wide bandwidth. To accommodate wide bandwidth compensation, the expressions in equations (6) through (10) can be vectorized generate a compensation filter of length 2L+1, $$W^{(n)}=[w^{(n)}(-L) \ldots w^{(n)}(L)]^T, -L \leq k \leq L \quad (1)$$

where $$w_1^{(n+1)}(k)=w_1^{(n)}(k)+2\mu(\hat{s}_2[n]\hat{s}_1^*[n-k]), -L \leq k \leq L$$
$$w_2^{(n+1)}(k)=w_1^{(n)}(k)^*.$$

If a solution exists to decorrelate $\hat{s}_1[n]$ and $\hat{s}_2^*[n]$, then $$C_{\hat{s}\hat{s}}^*[k]=E[\hat{s}_1[n]\hat{s}_2^*[n-k]]=0, -L \leq k \leq L \quad (2)$$

over the filter span 2L+1. This implies that the filter response $h_1=w_1, h_2=w_2$. Although similar in appearance to an LMS form of adaptive equalization, this approach uses the cross correlation in a minimization search.

The steps described above consider the filters $W_1$ and $W_2$ to be odd symmetric, or conjugate filters. Real world demodulators are not symmetric, and exhibit varying frequency response on either side of the receiver center frequency.

To adequately compensate a demodulator using the blind methods outlined above, the sampling receiver IQ compensation estimation unit 135 uses a multiple step approach to build partial bandwidth filters (e.g., two half-band filters). The partial bandwidth filters are then spliced together in the frequency domain to form the final full band compensation filter.

To generate the full bandwidth filter coefficients for the sampling receiver IQ compensation filter 134, the sampling receiver IQ compensation estimation unit 135 converts the time-domain coefficients of each partial bandwidth filter to the frequency domain by a discrete Fourier transform (DFT). The partial bandwidth response signals are joined in the frequency domain to form a frequency response that is defined over the entire receiver bandwidth. At intersection points (e.g., f=0 for two half-bandwidth filters) the responses are averaged to define the midpoint of the full-bandwidth response. Then an inverse DFT is performed to convert the full-bandwidth response back to time domain coefficients.

Figure 4:
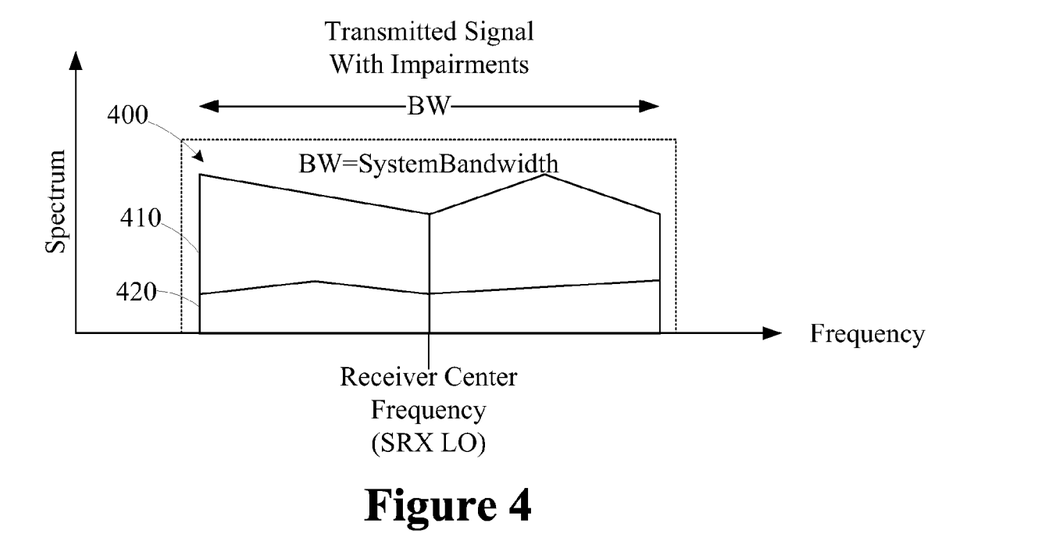
FIG. 4 is a diagram of a full bandwidth training signal for compensating a transmitter in the transceiver of FIG. 1.

After the sampling receiver IQ compensation filter 134 has been configured using the partial BW captures to build a full BW compensation filter for the sampling receiver 131, the transmitter 111 can be calibrated by using the compensated sampling receiver 131 as a training reference. As shown in FIG. 4, the training signal 119 is now configured as a full bandwidth signal 400 including a transmit signal 410 and a transmitter impairment signal 420. However, compensation of the transmitter 111 is possible now that the sampling receiver 131 may be used as a compensated training reference.

The subsequent final compensation of the transmitter 111 may be conducted using conventional techniques known to those of ordinary skill in the art. For example, the full bandwidth training signal is captured by the transmitter capture unit 116 prior to being modulated by the modulator 112 (i.e., prior to the transmitter impairments being introduced by the modulator 112). The signal received by the sampling receiver 131 is compensated by the sampling receiver IQ compensation filter 134 to remove the sampling receiver impairments. The filtered signal is then provided to the transmitter IQ compensation estimation unit 115, which compares the compensated received signal to the transmit signal captured by the transmitter capture unit 116. Prior to transmitter compensation, the compensated received signal includes transmitter impairments. By comparing the compensated received signal to the transmit signal, the transmitter IQ compensation estimation unit 115 identifies the impairments and generates coefficients for the transmitter IQ compensation filter 114 to compensate for the transmitter impairments. For clarity and to avoid obscuring the present subject matter, these conventional techniques are not described in greater detail herein.

The techniques described herein allow compensation of the transmitter 111 using the compensated receiver 131 without the use of an external training signal. This approach simplifies the compensation techniques, thereby potentially reducing the complexity and cost of the transceiver.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method for compensating a transceiver for impairments, comprising:
   transmitting a plurality of partial bandwidth training signals using a transmitter;
   capturing a plurality of response signals of a receiver having a bandwidth and exhibiting receiver impairments, each response signal being associated with one of the partial bandwidth training signals, wherein each of the partial bandwidth training signals is associated with a portion of the receiver bandwidth;
   generating a plurality of partial compensation filters based on the plurality of response signals, each partial compensation filter being associated with one of the response signals; and
   combining the partial compensation filters to configure a receiver compensation filter operable to compensate for the receiver impairments.

2. The method of claim 1, further comprising:
   transmitting a full bandwidth training signal using the transmitter, wherein the transmitter has transmitter impairments;
   capturing a second response signal of the receiver to the full bandwidth training signal;
   filtering the second response signal using the receiver compensation filter to generate a filtered response signal and comparing the full bandwidth training signal to the filtered response signal and configuring a transmitter compensation filter to compensate for the transmitter impairments based on the comparison.

3. The method of claim 2, further comprising filtering data to be transmitted by the transmitter using the transmitter compensation filter.

4. The method of claim 3, further comprising filtering data received by the receiver using the receiver compensation filter.

5. The method of claim 1, wherein generating a selected one of the partial compensation filters comprises:
- capturing the response signal of the receiver for the associated partial bandwidth training signal;
- generating a conjugate signal of the response signal;
- generating an estimation signal based on the response signal, the conjugate signal, and a plurality of filter coefficients;
- iteratively adjusting the filter coefficients to minimize a contribution of the conjugate signal to the estimation signal; and
- configuring the selected partial compensation filter using the adjusted coefficients.

6. The method of claim 1, wherein combining the partial compensation filters comprises:
- transforming each partial compensation filter to the frequency domain;
- joining the transformed partial compensation filters in the frequency domain; and
- transforming the joined partial compensation filters to the time domain to generate the receiver compensation filter.

7. The method of claim 6, wherein joining the transformed partial compensation filters comprises averaging the transformed partial compensation filters at overlapping points.

8. A method for compensating a transceiver for impairments, comprising:
- transmitting a first training signal using a transmitter;
- capturing a first response signal of a receiver having receiver impairments to the first training signal, wherein the first training signal spans a first half of a bandwidth of the receiver;
- generating a first partial compensation filter based on the first response signal;
- transmitting a second training signal using the transmitter;
- capturing a second response signal of the receiver to the second training signal, wherein the second training signal spans a second half of the bandwidth of the receiver;
- generating a second partial compensation filter based on the second response signal;
- combining the first and second partial compensation filters to generate a receiver compensation filter operable to compensate for the receiver impairments.

9. The method of claim 8, further comprising:
- transmitting a third training signal using the transmitter, wherein the transmitter has transmitter impairments, and the third training signal spans a bandwidth of the transmitter;
- capturing a third response signal of the receiver to the third training signal;
- filtering the third response signal using the receiver compensation filter to generate a filtered response signal; and
- comparing the third training signal to the filtered response signal and configuring a transmitter compensation filter to compensate for the transmitter impairments based on the comparison.

10. The method of claim 9, further comprising filtering data to be transmitted by the transmitter using the transmitter compensation filter.

11. The method of claim 10, further comprising filtering data received by the receiver using the receiver compensation filter.

12. The method of claim 8, wherein generating the first partial compensation filter comprises:
- generating a first conjugate signal of the first response signal;
- generating a first estimation signal based on the first response signal, the first conjugate signal, and a first plurality of filter coefficients;
- iteratively adjusting the first plurality of filter coefficients to minimize a contribution of the first conjugate signal to the first estimation signal; and
- configuring the first partial compensation filter using the adjusted first plurality of filter coefficients.

13. The method of claim 12, wherein generating the second partial compensation filter comprises:
- generating a second conjugate signal of the second response signal;
- generating a second estimation signal based on the second response signal, the second conjugate signal, and a second plurality of filter coefficients;
- iteratively adjusting the second plurality of filter coefficients to minimize a contribution of the second conjugate signal to the second estimation signal; and
- configuring the second partial compensation filter using the adjusted second plurality of filter coefficients.

14. The method of claim 8, wherein combining the first and second partial compensation filters comprises:
- transforming each of the first and second partial compensation filters to the frequency domain;
- joining the transformed first and second partial compensation filters in the frequency domain; and
- transforming the joined first and second partial compensation filters to the time domain to generate the receiver compensation filter.

15. The method of claim 14, wherein joining the transformed first and second partial compensation filters comprises averaging the transformed first and second partial compensation filters at overlapping points.

16. A transceiver, comprising:
- a transmitter operable to transmit a plurality of partial bandwidth training signals;
- a receiver having impairments and being operable to receive the plurality of partial bandwidth training signals;
- a receiver capture unit operable to capture a plurality of response signals of the receiver, each response signal being associated with one of the partial bandwidth training signals, wherein each of the partial bandwidth training signals is associated with a portion of the receiver bandwidth;
- a receiver compensation filter operable to filter signals received by the receiver;
- a receiver compensation estimation unit operable to generate a plurality of partial compensation filters based on the plurality of response signals, each partial compensation filter being associated with one of the response signals, and combine the partial compensation filters to configure the receiver compensation filter to compensate for the receiver impairments.

17. The transceiver of claim 16, wherein the transmitter has impairments and is further operable to transmit a full bandwidth training signal, the capture unit is operable to capture a second response signal of the receiver to the full bandwidth training signal, the receiver compensation filter is operable to filter the second response signal to generate a filtered response signal, and the transceiver further comprises:
- a transmitter compensation filter operable to filter signals sent by the transmitter;
- a transmitter capture unit operable to capture the full bandwidth training signal; and
- a transmitter compensation estimation unit operable to compare the captured full bandwidth training signal to the filtered response signal and configure the transmitter compensation filter to compensate for the transmitter impairments based on the comparison.

18. The transceiver of claim 16, wherein the receiver compensation estimation unit is operable to generate a selected one of the partial compensation filters by generating a conjugate signal of the response signal captured by the receiver capture unit for the associated partial bandwidth training signal, generating an estimation signal based on the response signal, the conjugate signal, and a plurality of filter coefficients, iteratively adjusting the filter coefficients to minimize a contribution of the conjugate signal to the estimation signal, and configuring the selected partial compensation filter using the adjusted coefficients.

19. The transceiver of claim 16, wherein the receiver compensation estimation unit is operable to combine the partial compensation filters by transforming each partial compensation filter to the frequency domain, joining the transformed partial compensation filters in the frequency domain, and transforming the joined partial compensation filters to the time domain to generate coefficients for the receiver compensation filter.

20. The transceiver of claim 19, wherein the receiver compensation estimation unit is operable to join the transformed partial compensation filters by averaging the transformed partial compensation filters at overlapping points.

* * * * *